United States Patent [19]

Robertson

[11] Patent Number: 4,926,397

[45] Date of Patent: May 15, 1990

[54] DEPTH ALARM FOR A SEISMIC SENSOR

[75] Inventor: Bob K. Robertson, Stafford, Tex.

[73] Assignee: Teledyne Exploration, Houston, Tex.

[21] Appl. No.: 434,338

[22] Filed: Nov. 13, 1989

[51] Int. Cl.⁵ .................. H04R 17/00; H01L 41/08
[52] U.S. Cl. ............................ 367/157; 367/167; 310/337
[58] Field of Search ............... 367/157, 160, 161, 163, 367/165, 167, 172, 173, 180, 188; 310/337, 334

[56] References Cited

U.S. PATENT DOCUMENTS

| | | | |
|---|---|---|---|
| 3,660,809 | 5/1972 | Pearson | 340/85 |
| 3,970,878 | 7/1976 | Berglund | 340/10 |
| 4,841,192 | 6/1989 | Tetlie et al. | 367/157 X |

Primary Examiner—Brian S. Steinberger
Attorney, Agent, or Firm—William A. Knox

[57] ABSTRACT

A hydrophone having a self-contained means for warning an operator that the hydrophone has reached or exceeded a safe design depth limit. The active elements of the hydrophone are bender-type piezoelectric wafers. An internal stop is provided such that in the presence of a hydrostatic pressure that exceeds a safe design limit, the wafers bottom out against the stop. The stop short-circuits the electrical output signals of the wafers, warning the operator that the hydrophone is in danger of destruction.

8 Claims, 1 Drawing Sheet

DEPTH ALARM FOR A SEISMIC SENSOR

BACKGROUND OF THE INVENTION

1. Field of the Invention

This invention provides a means for alterting a user that a seismic sensor has reached or exceeded a safe design depth.

2. Discussion of the Prior Art

In the art of geophysical exploration at sea, a ship tows a seismic streamer cable along an assigned line of survey. The streamer cable may be one or two miles long and may contain many hundreds of hydrophones. A acoustic pulse is generated in the water at or near the surface. The pulse travels downwardly into the sub-ocean strata whence it is reflected back towards the water surface where the reflected signals are detected by the hydrophones. Ordinarily, the streamer cable and its hydrophones is towed at a depth of 25 to 50 meters.

Typically, a hydrophone consists of two piezoelectric ceramic wafers cemented to thin metal diaphragms which in turn are sealed to the opposite ends of a short cylindrical spacer. The opposite surfaces of the wafers are usually silvered and the wafers are polarized. Electrical signal leads are soldered to the silvered surfaces. Alternatively, one side or pole of each wafer may be cemented to the metal diaphragm with conductive epoxy. The diaphragm becomes one terminal. The other terminal is formed by a single lead soldered to the other face, that is, the free pole, of each wafer. Water pressure variations applied to the hydrophones cause the wafers to flex, giving rise to electrical output signals in response to the varying applied pressures.

Hydrophones, such as above described, have definite design operating-depth limits. If subjected to an excess hydrostatic pressure, the wafers bend too far inwardly, they crack and are destroyed. One such hydrophone is taught by U.S. Pat. No. 3,660,809 issued 05/02/72 to R. Pearson.

The cracking problem due to excess over-pressure can be solved to some extent by inserting a plastic stop inside the cylindrical spacer. In the presence of an excessive pressure, the diaphragm and wafer are deformed inwardly but bottom out against the stop. See for example, U.S. Pat. No. 3,970,878 issued 08/20/76 to C. Berglund, which is incorporated herein by reference. Although the piezoelectric wafer may not actually crack when subjected to an unsafe pressure, the electrical output signals are distorted and the hydrophone loses sensitivity. Furthermore, the case of a '878 type hydrophone tends to acquire a permanent set or crumpling when subjected to an excess pressure. That effect further distorts the output signal.

Streamer cables are provided with depth sensors to monitor the average cable depth. The depth sensors may be mounted on the streamer cable at intervals of perhaps 1000 feet or more. In between the depth sensors, the streamer cable may sink or sag to an unsafe depth, due for example to an abrupt local reduction in water density or to a change in towing speed, yet the operator would not necessarily know that fact. In the case of a '809-type sensor, destruction of the hydrophone would result in a dead signal channel but by the time the operator discovers that situation, it is too late; the hydrophone is ruined. In the case of a '878 hydrophone, the channel would still be alive but the signal distortion likely would remain unrecognized.

It is a purpose of this invention to provide a hydrophone having self-contained means for warning an operator that the hydrophone has reached or exceeded a safe design depth so that the operator can take remedial action before signal degradation occurs and/or the hydrophone is destroyed.

SUMMARY OF THE INVENTION

I provide a hydrophone for use in a body of water that consists of a sealed, conductive case that has parallel opposed end portions. The end portions are deformable in proportion to the applied hydrodynamic pressure. One pole of a polarized piezoelectric wafer is conductively cemented to the inner portion of one of the end portions. A conductor is soldered to the other or free pole of the wafer. When flexed due to deformation of the end portion by pressure variations, the wafer produces an electrical output signal. Means are mounted internally of the case for disabling the electrical output signals when the hydrophone is subjected to a pressure that exceeds a safe design pressure or depth limit.

In another aspect of this invention, the disabling means takes the form of a conductive stop. When the free pole of the wafer bottoms out and contacts the stop due to an overpressure, the conductive stop short circuits the electrical output signals to the case.

BRIEF DESCRIPTION OF THE FIGURES

These and other benefits of my invention will be better understood by reference to the detailed description and the drawings wherein.

DETAILED DESCRIPTION OF THE INVENTION

Figure 1:
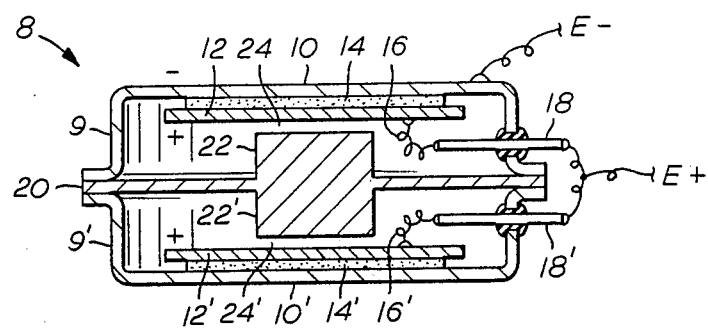
FIG. 1 is a cross sectional view of the hydrophone of this invention.

Referring now to FIG. 1, there is shown a hydrophone generally shown as 8. The hydrophone 8 consists of a hollow conductive case that is preferably made in two halves 9 and 9' to provide parallel opposed deformable end portions 10 and 10'. Preferably the case is made of beryllium copper alloy, No. 25. The opposed end portions are deformable in proportion to variations in applied hydrostatic pressure. The details of construction of the case are described in the '878 patent mentioned supra.

Figure 2:
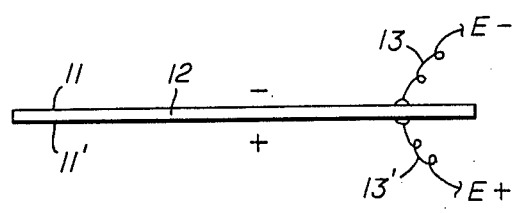
FIG. 2 is an illustration of a polarized piezoelectric wafer.

With reference to FIG. 2, piezoelectric wafers such as 12 are provided. The wafer surfaces 11 and 11' are plated with a conductive silver overcoating and the wafer is polarized to form positive and negative poles as shown. The silver overcoating provides means for soldering electrical leads such as 13, 13' for conducting output voltages E− and E+ to the outside world when the wafer is flexed.

Returning to FIG. 1, piezoelectric wafers 12 and 12' are secured to the inner surfaces of deformable end portions 10 and 10' by conductive cement layers 14 and 14' such as epoxy with like poles facing each other. Preferably, the negative pole of the wafers is cemented to the deformable end portions so that the case itself serves as a common negative terminal. Electrical leads 16 and 16' are soldered to the inwardly-facing free or positive pole of each wafer and pass through the case via insulating grommets 18 and 18'. The structure of the insulating grommets is described in the '878 reference and need not be further described here.

A conductive disk 20, preferably of brass, having raised central portions or stops 22 and 22' is mounted internally between the two halves 9 and 9' of the case. The height of each case half is adjusted so that there is a small clearance such as 24 and 24' between the stops 22 and 22' and the free poles of wafers 12 and 12'. Thus, by dimensioning the case itself, I provide means for adjusting the clearance. The clearance is a function of the modulus of elasticity of the deformable end portions and the safe design pressure limit. For example, using the alloy mentioned supra, and for a design depth limit of 35 meters, the clearance is preferably 0.008 inch (in this disclosure, the terms depth and pressure are used interchangeably). The clearance is adjusted of course, when the pressures inside and outside the case are equalized. The clearance may be derived empirically from laboratory tests if desired. After the various components of the hydrophone 8 have been assembled, the two halves 9 and 9' of the case and the internally mounted conductive disk 20 are soldered together around the edges to seal the assembly against water invasion.

Figure 3:
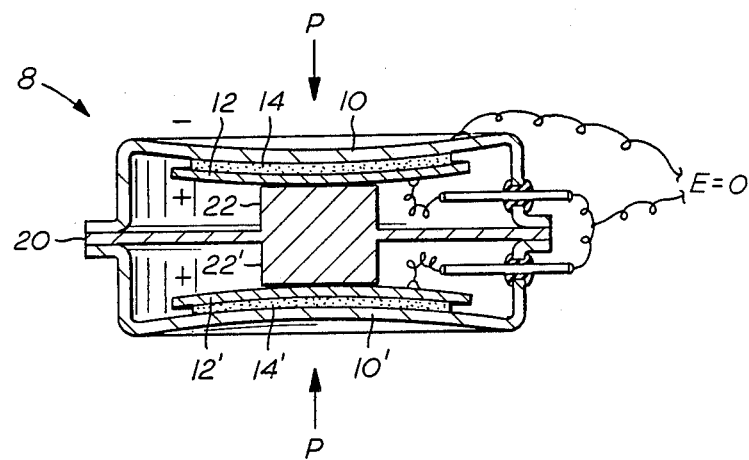
FIG. 3 shows the configuration of the wafers when squeezed inwardly by an externally-applied pressure.

The stops 22 and 22' are designed limit the inward excursion of the deformable end portions and to electrically contact the free, inwardly-facing poles of the wafers 12 and 12' when they bottom out against the stops due to an overpressure that reaches or exceeds the safe design pressure P as shown in FIG. 3. When the deformable end portions 10 and 10' are squeezed inwardly by the external pressure, the electrical output E+ of the free inwardly-facing poles (which are of the like polarity) is short circuited to the case such that the hydrophone output signal is disabled; that is, E=0. Assuming that each hydrophone is coupled to its own signal display channel, the presence of one or more dead channels warns the operator that immediate remedial action is required to prevent harm to his instruments. In some streamer cables, a group of three or more hydrophones, spaced apart by a few feet, constitute a single channel. Because the hydrophones are so closely spaced, it is to be expected that not just one, but that the entire group will disable itself under adverse conditions. I have thus disclosed a self-contained depth warning system for a hydrophone.

Figure 4:
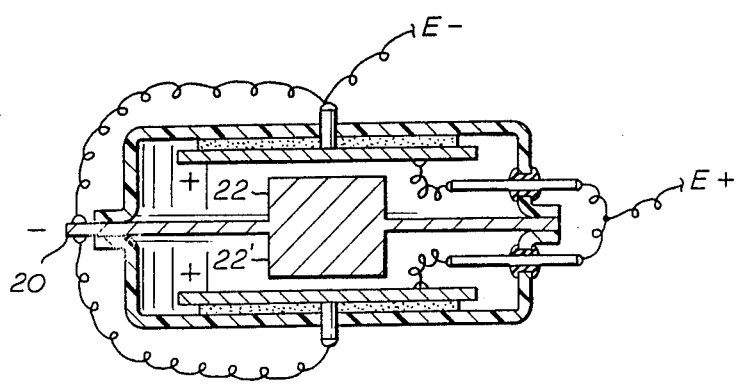
FIG. 4 is an alternate embodiment of the hydrophone of FIG. 1.

In the previous discussion, it was assumed that the case of the hydrophone is metallic or at least conductive. If the case is made of some other material such as nonconductive plastic, the conductive disk 20 can serve as the common terminal for the negative, outwardly-facing poles of the wafers as shown by the wiring diagram of FIG. 4. Otherwise, the construction details remain substantially the same as for FIGS. 1–3.

In this disclosure, the term "hydrostatic pressure" refers to the static pressure due to a column of water at some particular depth. The term "hydrodynamic pressure" refers to the dynamic pressure differences that are created by acoustic wave fields propagating through the water at that particular depth. In effect, the hydrostatic pressure is an average pressure base line about which the hydrodynamic pressure variations fluctuate.

It is customary in the industry for the outwardly-facing pole of a wafer to have negative polarity and for an inwardly-facing pole to have positive polarity. Of course, that arrangement could be reversed, just so long as like poles face each other. Other design differences may be conceived by those skilled in the art but which will remain within the scope and spirit of this invention which is limited only by the appended claims.

I claim as my invention:

1. A hydrophone for use in a body of water, comprising:

a hollow sealed case having parallel opposed conductive end portions, said end portions being deformable in proportion to variations in applied hydrodynamic pressures;

at least one polarized piezoelectric wafer, one pole of which is conductively cemented to the inner surface of a one of said deformable end portions, the free pole of which is coupled to an electrical signal output lead, said piezoelectric wafer generating an electrical output signal when flexed by hydrodynamic pressure variations applied to said deformable end portions; and means, mounted internally of said case and electrically coupled to said conductive end portions, for disabling said electrical output signals when an externally applied excessive hydrostatic pressure exceeds a preselected pressure limit.

2. The hydrophone as defined by claim 1 wherein said means for disabling comprises:

an internal conductive stop means for electrically contacting said free pole of said piezoelectric wafer when said deformable end portion forces said wafer to bottom out against said stop due to said externally applied excessive hydrostatic pressure.

3. The hydrophone as defined by claim 2, wherein:

said conductive stop short-circuits the electrical output signals of said piezoelectric wafer when said stop is contacted by the free pole of said piezoelectric wafer.

4. The hydrophone as defined by claim 2, comprising:

a polarized piezoelectric wafer conductively cemented to each said deformable conductive end portion; and said conductive stop short-circuits the electrical outputs of both said wafers when said deformable end portions force said wafers to bottom out against said stop due to said excessive hydrostatic pressure.

5. The hydrophone as defined by claim 2, comprising:

means for providing a clearance between the internal stop and the free pole of the piezoelectric wafer when the internal case pressure is equalized with respect to the external case pressure, the amount of the clearance being calculated as a function of the modulus of elasticity of said deformable end portions and said preselected hydrostatic pressure limit.

6. A self-contained depth warning system for a hydrophone, comprising:

a sealed case having opposed deformable end portions each for receiving secured to their interior surfaces a polarized piezoelectric wafer, each said wafer having inwardly and outwardly facing poles; and a conductive stop mounted interiorly of said case between the polarized piezoelectric wafers for limiting an inward excursion of said wafers due to an external hydrostatic pressure, said conductive stop being electrically coupled to the outwardly-facing pole of each said wafer to form a common terminal therefore, said conductive stop being spaced-apart from the inwardly-facing pole of each said wafer so long as the external hydrostatic pressure is less than a preselected pressure limit for the hydrophone.

7. The depth warning system as defined by claim 6, wherein:
said conductive stop short-circuits the outwardly-facing poles of said piezoelectric wafers to the inwardly-facing poles when the external hydrostatic pressure exceeds the preselected pressure limit causing said wafers to bottom output against said stop.

8. The depth warning system as defined by claim 7, wherein:
said inwardly facing poles are of like polarity.

* * * * *